US007042924B2

(12) United States Patent
Kawabata

(10) Patent No.: US 7,042,924 B2
(45) Date of Patent: May 9, 2006

(54) SYNCHRONIZATION ESTABLISHING AND TRACKING CIRCUIT FOR CDMA BASE STATION

(75) Inventor: Hisashi Kawabata, Tokyo (JP)

(73) Assignee: NEC Corporation, (JP)

( * ) Notice: Subject to any disclaimer, the term of this patent is extended or adjusted under 35 U.S.C. 154(b) by 844 days.

(21) Appl. No.: 09/760,592

(22) Filed: Jan. 16, 2001

(65) Prior Publication Data

US 2001/0017854 A1 Aug. 30, 2001

(30) Foreign Application Priority Data

Jan. 17, 2000 (JP) ............................. 2000-008207

(51) Int. Cl.
*H04B 1/69* (2006.01)
(52) U.S. Cl. ...................... 375/142; 375/150; 375/343; 375/362; 375/367; 370/342; 455/561
(58) Field of Classification Search ........ 375/142–148, 375/343, 325, 150, 152, 367, 362; 455/561, 455/560, 562.1; 370/311, 342, 209, 320, 370/335, 515; 329/304, 306
See application file for complete search history.

(56) References Cited

U.S. PATENT DOCUMENTS

| 5,287,067 A * | 2/1994 | Denno et al. ............... 329/304 |
| 6,212,406 B1 * | 4/2001 | Keskitalo et al. ......... 455/562.1 |
| 6,463,048 B1 * | 10/2002 | Garyantes .................. 370/342 |

FOREIGN PATENT DOCUMENTS

| JP | 7-193857 | 7/1995 |
| JP | 10-28076 | 1/1998 |
| JP | WO98/13956 | 4/1998 |
| JP | 11-17648 | 1/1999 |
| JP | 11-122104 | 4/1999 |
| JP | 11-274980 | 10/1999 |
| JP | 2000-134181 | 5/2000 |
| JP | 10-247869 | 9/2003 |

OTHER PUBLICATIONS

Japanese Office Action issued Mar. 2003 (w/ English translation of relevant portion).
Japanese Office Action issued Aug. 7, 2003 (w/ English translation of relevant portion).

* cited by examiner

*Primary Examiner*—Khai Tran
*Assistant Examiner*—Edith Chang
(74) *Attorney, Agent, or Firm*—Dickstein, Shapiro, Morin & Oshinsky, LLP.

(57) ABSTRACT

A synchronization establishing and tracking circuit for a CDMA base station is composed of a first spreading code generator, a first correlator, a second spreading code generator, a second correlator, and a phase determining circuit. The first spreading code generator generates a first spreading code sequence. The first correlator calculates first correlation between the first spreading code sequence and a first quasi-coherent signal corresponding to a first received signal received by the CDMA base station. The second spreading code generator generates a second spreading code sequence. The second correlator calculates second correlation between the second spreading code sequence and a second quasi-coherent signal corresponding to a second received signal received by the CDMA base station. The phase determining circuit determines a first phase of the first spreading code sequence based on an added quasi-coherent signal to which the first and second quasi-coherent signals are added.

22 Claims, 5 Drawing Sheets

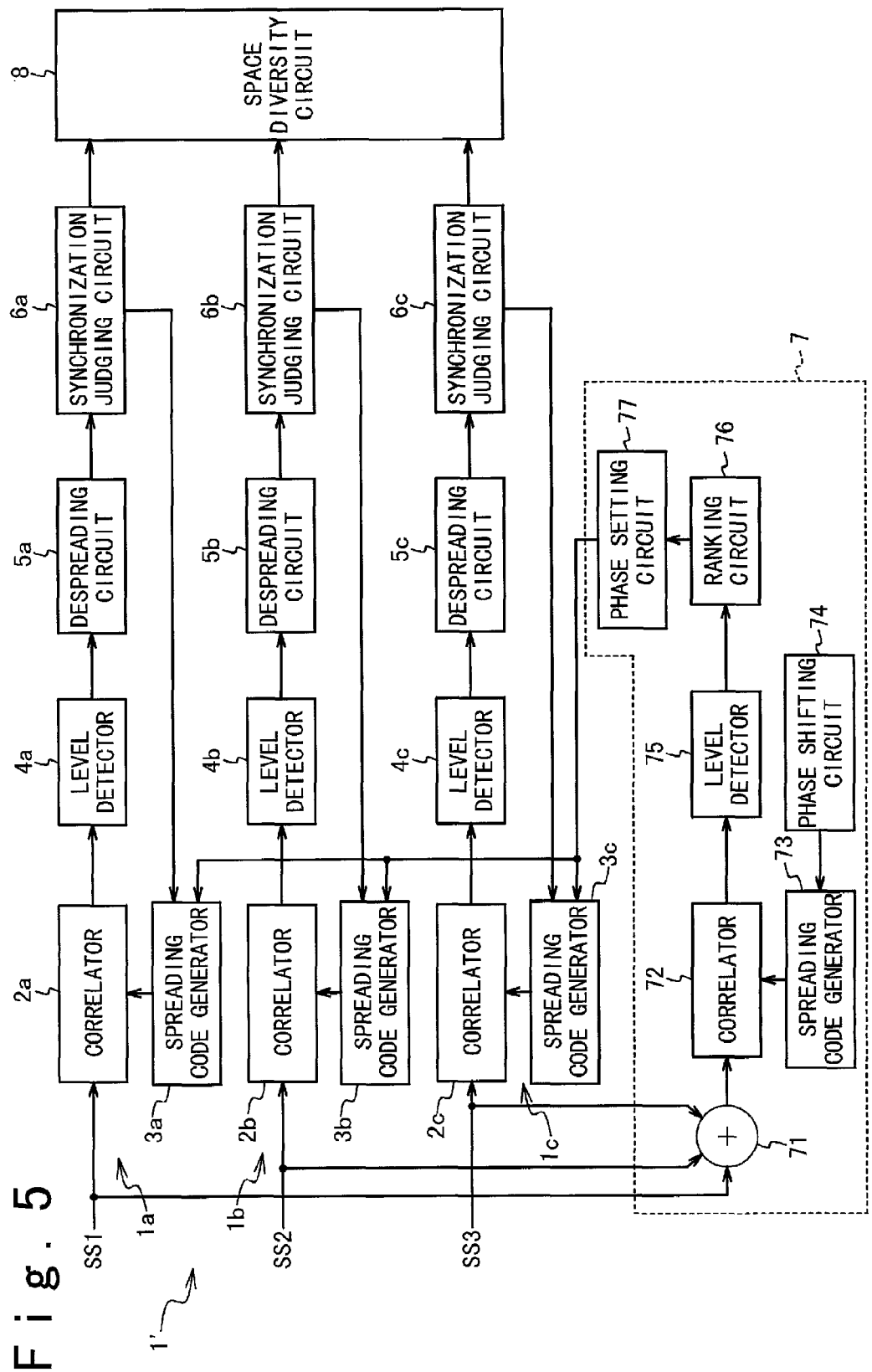

SYNCHRONIZATION ESTABLISHING AND TRACKING CIRCUIT FOR CDMA BASE STATION

BACKGROUND OF THE INVENTION

1. Field of the Invention

The present invention relates to a synchronization establishing and tracking circuit. More particularly, the present invention relates to a synchronization establishing and tracking circuit installed in a base station of a CDMA radio telecommunication system.

2. Description of the Related Art

Each base station in a CDMA (code division multiple access) telecommunication system forms a cell representing a control space. The cell is divided into multiple sectors for optimum use of a given wave resource. The base station thus includes communication circuits, each of which corresponds to each of the sectors. Also, provided in the base station are synchronization establishing and tracking circuits for estimating the phase of spreading codes to despread the received signal. The synchronization establishing and tracking circuits in the base station are needed the same number as of the sectors. Such techniques about the synchronization establishing tracking circuits are disclosed in Japanese Laid Open Patent Application (Jp-A-Heisei 10-28076, Jp-A-Heisei 11-17648, and Jp-A-Heisei 11-122104). Also, a matched filter circuit used in a demodulator for CDMA communication system is disclosed in Japanese Laid Open Patent Application (Jp-A-Heisei 11-274980).

FIG. 1 illustrates a conventional synchronization establishing and tracking circuit. In FIG. 1, the synchronization establishing and tracking circuit 100 is linked with three sectors. The number of the sectors is not limited to three. In a current system, six sectors are commonly used at the base station.

The synchronization establishing and tracking circuit 100 comprises first, second and third synchronization establishing and tracking portion 101a, 101b, and 101c. The first synchronization establishing and tracking portion 101a carries out a control action over the first sector. The second synchronization establishing and tracking portion 101b carries out a control action over the second sector. The third synchronization establishing and tracking portion 101c carries out a control action over the third sector.

The first synchronization establishing and tracking portion 101a includes a first correlator 102a, a first spreading code generator 103a, a first level detector 104a, a first despreading circuit 105a, a first synchronization judging circuit 106a, and a first phase shifting circuit 111a.

The second synchronization establishing and tracking portion 101b includes a second correlator 102b, a second spreading code generator 103b, a second level detector 104b, a second despreading circuit 105b, a second synchronization judging circuit 106b, and a second phase shifting circuit 111b.

The third synchronization establishing and tracking portion 101c includes a third correlator 102c, a third spreading code generator 103c, a third level detector 104c, a third despreading circuit 105c, a third synchronization judging circuit 106c, and a third phase shifting circuit 111c.

The first synchronization establishing and tracking portion 101a receives a first quasi-coherent signal SS1. The second synchronization establishing and tracking portion 101b receives a second quasi-coherent signal SS2. The third synchronization establishing and tracking portion 101c receives a third quasi-coherent signal SS3.

The output of the first correlator 102a in the first synchronization establishing and tracking portion 101a is connected to the input of the first level detector 104a. The output of the first level detector 104a is connected to the input of the first despreading circuit 105a. The output of the first despreading circuit 105a is connected to the input of the first synchronization judging circuit 106a. The output of the first phase shifting circuit 111a is connected to the input of the first spreading code generator 103a. The output of the first spreading code generator 103a is connected to the first correlator 102a. The output of the first synchronization judging circuit 106a is connected to the input of the first spreading code generator 103a.

The phase shifting circuit 111a determines the phase used in the first spreading code generator 103a. The first spreading code generator 103a generates a spreading code sequence. The phase of the spreading code sequence is sequentially shifted at a resolution lower than one chip of the spreading code. The first spreading code generator 103a is timed with the phase determined by the first phase shifting circuit 111a. The first correlator 102a takes correlation between the first quasi-coherent signal and the spreading code to produce a correlation value. The level detector 104a generates a chip synchronous signal indicative of the received phase position having the maximum correlation value. The chip synchronous signal is then used for synchronization acquisition.

Through examining the chip synchronous signal, the first despreading circuit 105a despreads the quasi-coherent signal SS1 to produce a despread signal. The first synchronization judging circuit 106a judges the synchronization based on the despread signal from the first despreading circuit 105a. When detecting the synchronization, the first synchronization judging circuit 106a informs the first spreading code generator 103a of the synchronization. This allows the first spreading code generator 103a to generate the spreading code of the phase at the timing of the synchronization.

The second and third synchronization establishing and tracking portions 101b and 101c are identical in the arrangement to the first synchronization establishing and tracking portion 101a. Also, the second and third synchronization establishing and tracking portions 101b and 101c carry out the same processing action as of the first synchronization establishing and tracking portion 101a when receiving their corresponding quasi-coherent signals SS2 and SS3.

In such a synchronization establishing and tracking circuit, the level of a received signal is detected throughout its generous bit length to decrease the effect of fading at the station. The amount of the data calculated in the correlators 102a, 102b and 102c is increased proportional to the bit length. When the calculation of the correlation is executed using a corresponding number of the correlators, its duration may be shortened. However, the higher the number of the correlators, the greater the synchronization establishing and tracking circuit will become in the circuitry arrangement, thus inhibiting the down sizing and the energy saving of the synchronization establishing and tracking circuit.

SUMMARY OF THE INVENTION

Therefore, an object of the present invention is to provide a synchronization establishing and tracking circuit capable of detecting the phase at higher accuracy without increasing the size of its circuitry arrangement at a base station.

In order to achieve an aspect of the present invention, a synchronization establishing and tracking circuit for a CDMA base station is composed of a first spreading code generator, a first correlator, a second spreading code generator, a second correlator, and a phase determining circuit. The first spreading code generator generates a first spreading code sequence. The first correlator calculates first correlation between the first spreading code sequence and a first quasi-coherent signal corresponding to a first received signal received by the CDMA base station. The second spreading code generator generates a second spreading code sequence. The second correlator calculates second correlation between the second spreading code sequence and a second quasi-coherent signal corresponding to a second received signal received by the CDMA base station. The phase determining circuit determines a first phase of the first spreading code sequence based on an added quasi-coherent signal to which the first and second quasi-coherent signals are added.

The phase determining circuit desirably includes a ranking portion and a phase setting circuit. The ranking portion determines a plurality of target phases based on the added quasi-coherent signal. The phase setting circuit setting the first phase to a selected phase selected from among the target phases.

In this case, the ranking portion desirably determines an order of priority for the target phases based on the added quasi-coherent signal. In addition, the phase setting circuit desirably selects the selected phase in accordance with the order of priority.

The ranking portion may be composed of a phase determining spreading code generator, a phase determining correlator and a ranking circuit. The phase determining spreading code generator generates a phase determining spreading code sequence. A phase of the phase determining spreading code sequence is sequentially shifted to one of candidate phases. The phase determining correlator calculates correlation between the phase determining spreading code sequence and the added quasi-coherent signal to determine added signal correlation values respectively corresponding to the candidate phases. The ranking circuit selecting the target phases based on the correlation values.

The synchronization establishing and tracking circuit is desirably further composed of a maximum correlation phase determining circuit, a despreading circuit, and a synchronization detecting circuit. The maximum correlation phase determines circuit determining a despreading phase based on the first correlation. The despreading circuit despreads the first quasi-coherent signal to produce a despread signal using another spreading code sequence having the despreading phase. The synchronization detecting circuit detects a synchronization of the first quasi-coherent signal with the another spreading code sequence to output a synchronization informing signal informing the first spreading code generator of the synchronization. The first spreading code generator fixes the first phase based on the synchronization informing signal such that the synchronization of the first quasi-coherent signal with the despreading spreading code sequence is established.

Also, The phase determining circuit desirably determines a second phase of the second spreading code sequence based on the added quasi-coherent signal.

In this case, the phase determining circuit desirably includes a ranking portion and a phase setting circuit. The ranking portion determines a plurality of target phases based on the added quasi-coherent signal. The phase setting circuit sets the first and second phases to a selected phase selected from among the target phases.

In this case, furthermore, the ranking portion desirably determines an order of priority for the plurality of target phases based on the added quasi-coherent signal. At this time, the phase setting circuit desirably selects the selected phase in accordance with the order of priority.

The ranking portion is desirably composed of a phase determining spreading code generator, a phase determining correlator, and a ranking circuit. The phase determining spreading code generator generates a phase determining spreading code sequence. A phase of the phase determining spreading code sequence is sequentially shifted to one of candidate phases. The phase determining correlator calculates correlation between the phase determining spreading code sequence and the added quasi-coherent signal to determine added signal correlation values respectively corresponding to different phases of the candidate phases. The ranking circuit selects the target phases based on the correlation values.

The synchronization establishing and tracking circuit is desirably further composed of a first maximum correlation phase determining circuit, a first despreading circuit, a second maximum correlation phase determining circuit, a second despreading circuit, and a space diversity circuit. The first maximum correlation phase determining circuit determining a first despreading phase based on the first correlation. The first despreading circuit despreads the first quasi-coherent signal to produce a first despread signal using a third spreading code sequence having the first despreading phase. The second maximum correlation phase determining circuit determines a second despreading phase based on the second correlation. The second despreading circuit despreads the second quasi-coherent signal to produce a second despread signal using a fourth despreading spreading code sequence having the second despreading phase. The space diversity circuit identifying a direction of a mobile station transmitting at least one of the first and second received signals, based on the first and second despread signals.

In order to achieve another aspect of the present invention, a synchronization establishing and tracking circuit for a CDMA base station is composed of a spreading code generator, a correlator, a ranking circuit, and a phase setting circuit. The spreading code generator generates a spreading code sequence. The correlator calculates correlation between the spreading code sequence and a quasi-coherent signal corresponding to a received signal received by the CDMA base station. The ranking circuit stores a plurality of ranked phases. The phase setting circuit sets the phase to a selected phase selected from among the plurality of ranked phases.

The synchronization establishing and tracking circuit is desirably further composed of an adding circuit. The adding circuit adds the quasi-coherent signal and at least one other quasi-coherent signal to produce an added quasi-coherent signal. The other quasi-coherent signal corresponds to one or more other received signal received by the CDMA base station. In this case, the plurality of ranked phases are desirably determined based on the added quasi-coherent signal.

In order to achieve still another aspect of the present invention, a synchronization establishing and tracking method for a CDMA base station is composed of generating a first spreading code sequence;

calculating first correlation between the first spreading code sequence and a first quasi-coherent signal corresponding to a first received signal received by the CDMA base station;

generating a second spreading code sequence;

calculating second correlation between the second spreading code sequence and a second quasi-coherent signal corresponding to a second received signal received by the CDMA base station;

producing an added quasi-coherent signal on which the first and second quasi-coherent signals are added; and determining a first phase of the first spreading code sequence based on the added quasi-coherent signal.

The synchronization establishing and tracking method is desirably further comprised of:

determining a plurality of target phases based on the added quasi-coherent signal;

selecting a selected phase from among the plurality of target phases;

setting the first phase to the selected phase.

The selecting desirably includes:

determining an order of priority for the target phases based on the added quasi-coherent signal; and selecting the selected phase based on the order of priority.

Also, the determining the plurality of target phases desirably includes:

generating a phase determining spreading code sequence such that a phase of the phase determining spreading code sequence is sequentially shifted to one of candidate phases;

calculating correlation between the phase determining spreading code sequence and the added quasi-coherent signal to determine added signal correlation values respectively corresponding to the candidate phases; and selecting the target phases from among the candidate phases based on the correlation values.

The synchronization establishing and tracking method is desirably further composed of:

determining a despreading phase based on the first correlation;

despreading the first quasi-coherent signal to produce a despread signal using another spreading code sequence having the despreading phase;

detecting a synchronization of the first quasi-coherent signal with the another spreading code sequence to output a synchronization informing signal indicative of the synchronization; and fixing the first phase based on the synchronization informing signal such that the synchronization of the first quasi-coherent signal with the another spreading code sequence is established.

Also, the synchronization establishing and tracking method is desirably composed of:

determining a second phase of the second spreading code sequence based on the added quasi-coherent signal.

In this case, the synchronization establishing and tracking method is desirably further composed of:

determining a plurality of target phases based on the added quasi-coherent signal; and setting the first and second phases to a selected phase selected from among the ranked phases.

Also, the synchronization establishing and tracking method is desirably further composed of:

determining a first despreading phase based on the first correlation;

despreading the first quasi-coherent signal to produce a first despread signal using a third spreading code sequence having the first despreading phase;

determining a second despreading phase based on the second correlation;

despreading the second quasi-coherent signal to produce a second despread signal using a fourth spreading code sequence having the second despreading phase; and identifying a direction of a mobile station transmitting at least one of the first and second received signals, based on the first and second despread signals.

In order to achieve yet still another aspect of the present invention, a synchronization establishing and tracking method for a CDMA base station is composed of:

generating a spreading code sequence;

calculating correlation between the spreading code sequence and a quasi-coherent signal corresponding to a first received signal received by the CDMA base station;

storing a plurality of ranked phases; and setting the phase to a selected phase selected from among the plurality of ranked phases.

The synchronization establishing and tracking method is desirably further composed of:

adding the quasi-coherent signal and at least one other quasi-coherent signal to produce an added quasi-coherent signal. The other quasi-coherent signal corresponds to one or more other received signal received by the CDMA station. In this case, the plurality of ranked phases are determined based on the added quasi-coherent signal.

BRIEF DESCRIPTION OF THE DRAWINGS

FIG. 5 is a block diagram of another synchronization establishing and tracking circuit according to the present invention.

DESCRIPTION OF THE PREFERRED EMBODIMENTS

A synchronization establishing and tracking circuit of the present invention will be described below in detail with reference to the attached drawings.

Figure 1:
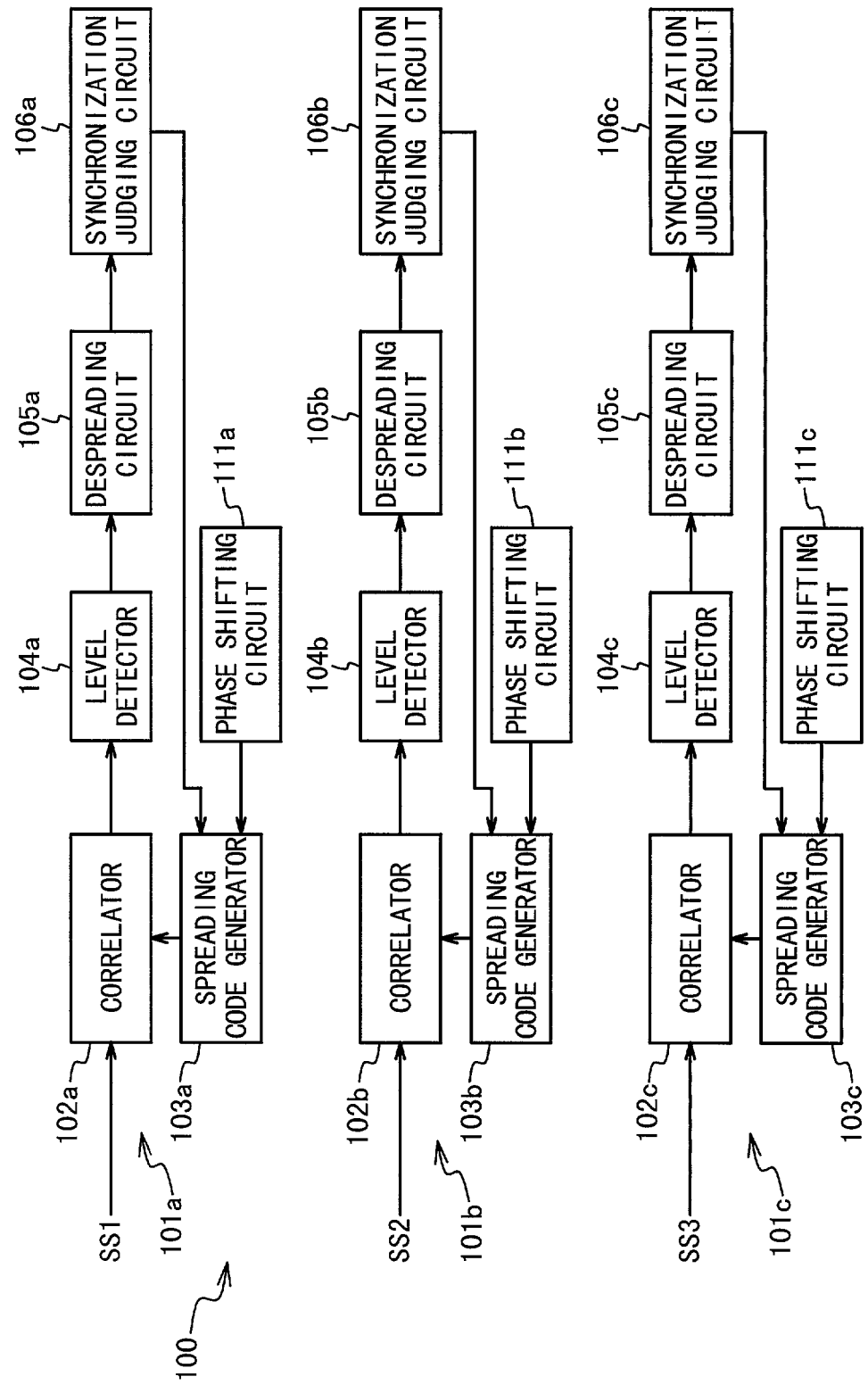
FIG. 1 is a block diagram of a conventional synchronization establishing and tracking circuit.
Figure 2:
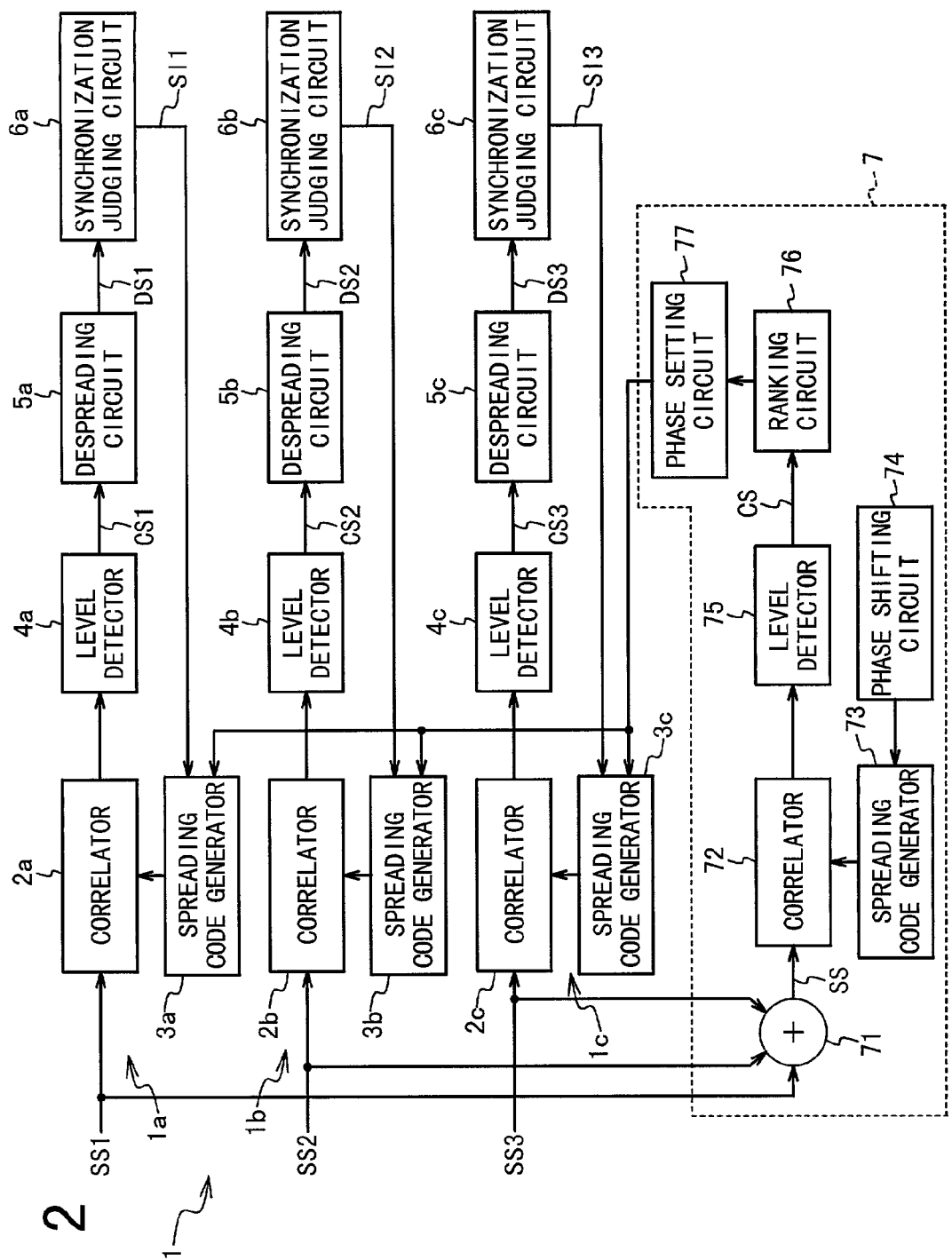
FIG. 2 is a block diagram of a synchronization establishing and tracking circuit according to the present invention.

FIG. 2 illustrates an arrangement of a synchronization establishing and tracking circuit of an embodiment of the present invention. The synchronization establishing and tracking circuit 1 is provided for a cell having three sectors. The number of the sectors is not limited to three.

The synchronization establishing and tracking circuit 1 includes first, second, and third correlation value calculator circuits 1a, 1b, and 1c. The first correlation value calculator circuit 1a is composed of a first correlator 2a, a first spreading code generator 3a, a first level detector 4a, a first despreading circuit 5a, and a first synchronization judging circuit 6a. The second correlation value calculator circuit 1b is composed of a second correlator 2b, a second spreading code generator 3b, a second level detector 4b, a second despreading circuit 5b, and a second synchronization judging circuit 6b. The third correlation value calculator circuit 1c is composed of a third correlator 2c, a third spreading code generator 3c, a third level detector 4c, a third despreading circuit 5c, and a third synchronization judging circuit 6c.

The synchronization establishing and tracking circuit 1 further includes a phase determining circuit 7. The phase determining circuit 7 includes an adder 71, a fourth correlator 72, a fourth spreading code generator 73, a phase shifting circuit 74, a fourth level detector 75, a ranking circuit 76, and a phase setting circuit 77.

The first correlator 2a receives a first quasi-coherent signal SS1. The second correlator 2b receives a second quasi-coherent signal SS2. The third correlator 2c receives a third quasi-coherent signal SS3.

The output of the first correlator 2a is connected to the input of the first level detector 4a. The output of the first level detector 4a is connected to the input of the first despreading circuit 5a. The output of the first despreading circuit 5a is connected to the input of the first synchronization judging circuit 6a. The output of the first synchronization judging circuit 6a is connected to the first input of the spreading code generator 3a. The output of the first spreading code generator 3a is connected to the correlator 2a.

The second and third correlation value calculator circuits 1b and 1c are identical in the arrangement to the first correlation value calculator circuit 1a.

The first, second, and third quasi-coherent signals SS1, SS2, and SS3 are inputted to the adder 71. The output of the adder 72 is connected to the fourth correlator 72. The output of the fourth correlator 72 is connected to the input of the fourth level detector 75. The output of the fourth level detector 75 is connected to the input of the ranking circuit 76. The output of the ranking circuit 76 is connected to the input of the phase setting circuit 77. The output of the phase setting circuit 77 is connected to the inputs of the first to third spreading code generators 3a to 3c. The output of the phase shifting circuit 74 is connected to the input of the fourth spreading code generator 73. The output of the fourth spreading code generator 73 is connected to the input of the fourth correlator 72.

The first correlator 2a calculates a correlation valve between the first quasi-coherent signal SS1 and a spreading code sequence generated by the spreading code generator 3a. The level detector 4a generates a chip synchronous signal CS1 indicative of a received signal phase position having the maximum correlation. The chip synchronous signal CS1 is then used for establishment of the synchronization. When receiving and examining the chip synchronous signal CS1, the first despreading circuit 5a despreads the quasi-coherent signal SS1 to produce a despread signal DS1. The first despreading circuit 5a despreads the quasi-coherent signal SS1 using another spreading code sequence (not shown) having a phase indicated by the chip synchronous signal CS1. The first synchronization judging circuit 6a examines the despread signal DS1 to judge the synchronization. More particularly, the first synchronization judging circuit 6a detects the synchronization between the quasi-coherent signal SS1 and the other spreading code sequence used in the despreading circuit 5a. Upon detecting the synchronization, the first synchronization judging circuit 6a informs the first spreading code generator 3a of the synchronization by sending a synchronization informing signal SI1. When receiving the synchronization informing signal SI1 indicative of the synchronization, the first spreading code generator 3a generates a spreading code sequence having the phase at the timing of the synchronization. The phase of the spreading code sequence is then fixed. As the phase of the spreading code sequence generated by the first diffusion generator circuit 3a is fixed, the synchronization can be maintained.

The second correlator 2b calculates a correlation value between the second quasi-coherent signal SS2 and a spreading code sequence generated by the second spreading code generator 3b. The level detector 4b generates a chip synchronous signal CS2 indicative of a received signal phase position having the maximum correlation. The chip synchronous signal CS2 is then used for establishment of the synchronization. When receiving and examining the chip synchronous signal CS2, the second despreading circuit 5b despreads the quasi-coherent signal SS2 to produce a despread signal DS2. The second despreading circuit 5b despreads the quasi-coherent signal SS2 using another spreading code sequence (not shown) having a phase indicated by the chip synchronous signal CS2. The second synchronization judging circuit 6b examines the despread signal DS2 to judge the synchronization. More particularly, the second synchronization judging circuit 6b detects the synchronization between the quasi-coherent signal SS2 and the other spreading code sequence used in the despreading circuit 5b. Upon detecting the synchronization, the second synchronization judging circuit 6b informs the second spreading code generator 3b of the synchronization by sending a synchronization informing signal SI2. When receiving the synchronization informing signal SI2 indicative of the synchronization, the second spreading code generator 3b generates a spreading code sequence of the phase at the timing of the synchronization. The phase of the spreading code is then fixed. As the phase of the spreading code generated by the second diffusion generator circuit 3b is fixed, the synchronization can be maintained.

The third correlator 2c calculates a correlation value between the third quasi-coherent signal SS3 and a spreading code sequence generated by the spreading code generator 3c. The level detector 4c generates a chip synchronous signal CS3 indicative of a received signal phase position having the maximum correlation. The chip synchronous signal CS3 is then used for establishment of the synchronization. When receiving and examining the chip synchronous signal CS3, the third despreading circuit 5c despreads the quasi-coherent signal SS3 to produce a despread signal DS3. The third despreading circuit 5c despreads the quasi-coherent signal SS3 using another spreading code sequence (not shown) having a phase indicated by the chip synchronous signal CS3. The third synchronization judging circuit 6c examines the despread signal DS3 to judge the synchronization. More particularly, the third synchronization judging circuit 6c detects the synchronization between the quasi-coherent signal SS3 and the other spreading code sequence. Upon detecting the synchronization, the third synchronization judging circuit 6c informs the third spreading code generator 3c of the synchronization by sending a synchronization informing signal SI3. When receiving the sync informing signal SI3 indicative of the synchronization, the third spreading code generator 3c generates a spreading code sequence of the phase at the timing of the synchronization. The phase of the spreading code sequence is then fixed. As the phase of the spreading code sequence generated by the third diffusion generator circuit 3c is fixed, the synchronization can be maintained.

The phase determining circuit 7 determines the phase of the above-mentioned spreading code sequences generated by first, second and third spreading code generator 3a, 3b and 3c. The fourth spreading code generator 73 in the phase determining circuit 7 generates still another spreading code sequence. The phase of the other spreading code sequence is determined by the phase shifting circuit 74. More specifically, the phase shifting circuit 74 carries out a phase shift operation at a resolution of not higher than one chip of the other spreading code sequence. The fourth spreading code generator 73 thus generates the other spreading code in synchronization with the phase determined by the phase shifting circuit 74.

The adder 71 adds the first, second and third quasi-coherent signals SS1, SS2 and SS3 to generate an added quasi-coherent signal SS.

The fourth correlator 72 calculates correlation values between the added quasi-coherent signal SS and the other spreading code sequence generated by the spread code generator 73. Each of the correlation values corresponds to a phase of the other spreading code sequence. The fourth level detector 75 then detects phase positions corresponding to peaks, that is, local maximums of the correlation values. The fourth level detector 75 outputs a chip synchronous signal CS indicative of the peak levels. Based on the chip synchronous signal CS, the ranking circuit 76 ranks the peak levels received from the level detector 75 to determine 100 ranked phase positions. Also, the ranking circuit 76 determines an order of priority and temporarily stores the 100 ranked phase positions. The ranking circuit 76 includes a processor and a memory (not shown), in which the 100 ranked phase positions are decrementally aligned in the order of priority.

The phase setting circuit 77 selects one of the 100 ranked phase positions according to the order of priority. Then the phase setting circuit 77 informs the first to third spreading code generators 3a to 3c of the selected phase positions. The informing is repeatedly carried out at in equal intervals of a predetermined time. The first to third spreading code generators 3a to 3c are timed by the phase determined by the phase setting circuit 77 to respectively generate the spreading codes.

Then, the chip synchronous signals CS1 to CS3, which is indicative of the received phase positions having the maximum of the correlation value, are generated by the manner described previously in the first to third level detector circuits 4a to 4c. The chip synchronous signals CS1 to CS3 are used for the establishment of the synchronization. Upon detecting the synchronization between the quasi-coherent signal and the chip synchronous signal, the first to third synchronization judging circuits 6a to 6c inform their corresponding first to third spreading code generators 3a to 3c of the synchronization. This allows the first to third spreading code generators 3a to 3c to generate the spreading codes of the phase at the timing of the synchronization.

Figure 3:
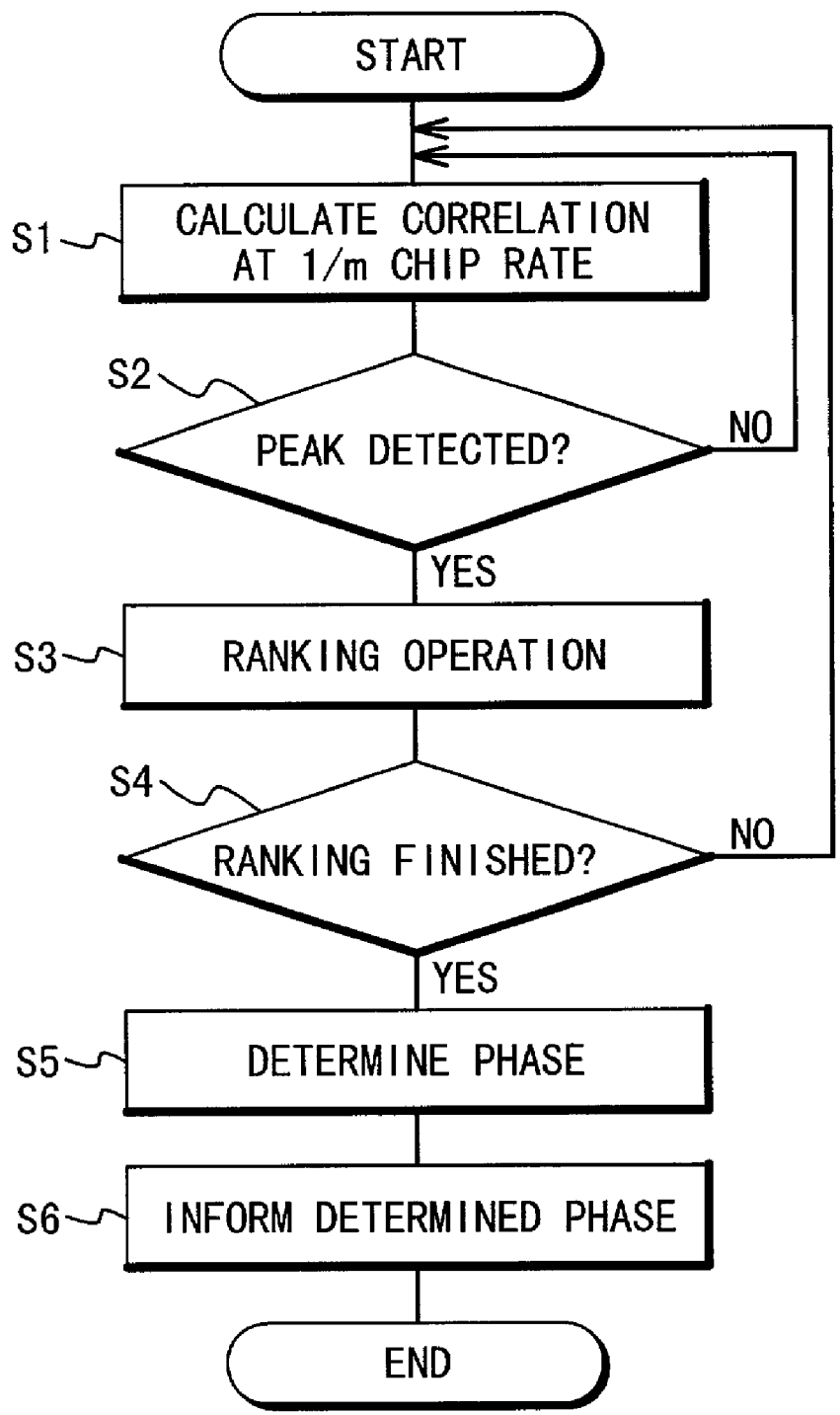
FIG. 3 is a first flowchart showing the operation of a synchronization establishing and tracking circuit according to the present invention.

FIG. 3 is a first flowchart showing steps of the operation of the synchronization establishing and tracking circuit 1 of the present embodiment. The steps are implemented by the phase determining circuit 7. When receiving the first to third quasi-coherent signals SS1 to SS3, the adder 71 produces the added quasi-coherent signal SS. The correlator 72 carries out the correlation process at a chip rate of 1/m (m>1) between the added quasi-coherent signal SS and the spreading code sequence generated by the spreading code generator 73 (S1). Then, a peak is detected in the level detector 75 (S2). If the peak is not detected in the level detector 75, the steps S1 and S2 are repeated. When the peak is detected in the level detector 75, its phase is ranked to determine the order of priority by the ranking circuit 76 (S3). The ranking circuit 76 monitors the end of a period (of time or data length) of carrying out the priority ordering process, that is, the ranking process (S4). Until the period is finished, the steps S1 to S4 are repeated. When the period is finished, the phase setting circuit 77 selects to determine one of the phase positions ranked in the ranking circuit 76 and informs the first to third spreading code generators 3a to 3c of the selected phase position (S6). The first to third spreading code generators 3a to 3c generates the spreading codes from the selected phase position.

Figure 4:
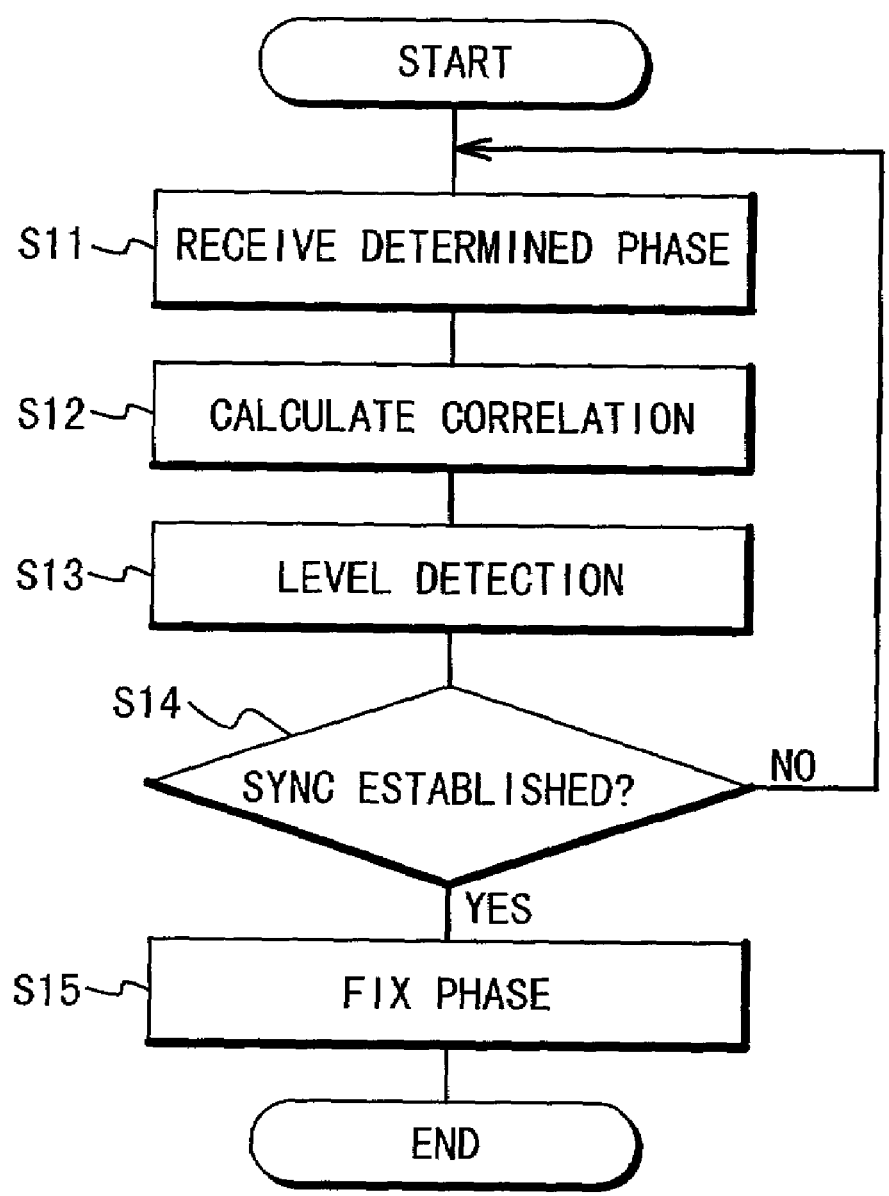
FIG. 4 is a second flowchart showing the operation of a synchronization establishing and tracking circuit according to the present invention.

FIG. 4 is a second flowchart showing steps of the operation of the synchronization establishing and tracking circuit of the present embodiment. The steps are implemented by each of the first to third correlation value calculator circuits 1a to 1c. The phase selected by the phase setting circuit 77 is received by the first to third spreading code generators 3a to 3c (S11). The first to third spreading code generators 3a to 3c generates the spreading codes having the selected phase. Then, the correlation process is carried by the first to third correlators 2a to 2c (S12). The level detection is carried out by the first to third level detector circuits 4a to 4c (S13) to determine a phase position having the maximum correlation. The quasi-coherent signals SS1 to SS3 are despread using spreading code sequences having the phase position. The first to third synchronization judging circuits 6a to 6c judge the synchronization from the result of the despreading processes carried by their corresponding first to third despreading circuits 5a to 5c (S14). When the synchronization is detected by the first to third synchronization judging circuits 6a to 6c, the phase at the timing of the synchronization is fixed by their corresponding first to third spreading code generators 3a to 3c (S15). This synchronization phase fixing involves the fixing of the phase of the spreading code by the first to third spreading code generators 3a to 3c. If the synchronization between the quasi-coherent signal and the tip synchronous signal is not established, the steps S11 to S14 are repeated.

As set forth above, the synchronization establishing and tracking circuit of the present embodiment produces the added quasi-coherent signal SS by adding a plurality of quasi-coherent signals SS1 to SS3. The added quasi-coherent signal SS is then subjected to the correlation process. The result of the correlation process is used for determining the chip synchronous signal CS indicative of the order of priority for ranked phases. The correlation for each sector is then calculated from the chip synchronous signal. This technique of calculating the correlation for each sector is more reduced in the data amount to be handled than that based on the quasi-coherent signals. Accordingly, the circuitry arrangement for the calculation corresponding to each sector can favorably be declined in the size.

The reduction in the data amount to be handled is explained in more detail with a base station having three sectors. It is assumed that the length for detecting the received phase position is 2000 chips, the spreading code length is 1000 bits, and the phase shift unit m is 1. In a conventional manner, the calculation of the correlation requires $3 \times 2000 \times 1000 = 6 \times 10^6$ times of processing operations. The correlation delay remaining according to the present invention is determined at the number of ranks of 100. The calculation of the correlation with the added quasi-coherent signal is $2000 \times 1000 = 2 \times 10^6$ times. For each sector, the correlation is calculated through $3 \times 100 \times 1000 = 3 \times 10^5$ times. Accordingly, the calculation according to the present invention requires $2.3 \times 10^6$ times which is reduced by about 60% than the conventional calculation. The higher the number of sectors, the more the reduction will increase.

FIG. 5 illustrates another embodiment of the synchronization establishing and tracking circuit of the present invention. A synchronization establishing and tracking circuit 1' shown in FIG. 5 incorporates a space diversity circuit 8 added to the synchronization acquisition circuit 1 shown in FIG. 2. The space diversity circuit 8 is connected to the outputs of the first to third synchronization judging circuits 6a to 6c. In the arrangement, the first to third correlation value calculator circuits 1a to 1c are respectively assigned to one single sector. As the sector is further divided spatially, the accuracy of communication direction can be improved. More specifically, the space diversity circuit 8 can identify the direction of a mobile station to be examined for the synchronization from the outputs of the first to third synchronization judging circuits 6a to 6c.

The synchronization acquisition circuit 1' including the space diversity circuit 8 is hence capable of reducing the data amount for the calculation of the correlation and identifying the direction of a mobile station to be examined.

The synchronization establishing and tracking circuit of the above-mentioned embodiments permits the data amount to be handled in the synchronization acquisition circuit at a base station having multiple sectors to be successfully reduced and thus the overall circuitry arrangement of the same using parallel installations to be minimized.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A synchronization establishing and tracking circuit for a CDMA base station comprising:
    a first spreading code generator generating a first spreading code sequence;
    a first correlator calculating first correlation between said first spreading code sequence and a first quasi-coherent signal corresponding to a first received signal received by said CDMA base station;
    a second spreading code generator generating a second spreading code sequence;
    a second correlator calculating second correlation between said second spreading code sequence and a second quasi-coherent signal corresponding to a second received signal received by said CDMA base station; and
    a phase determining circuit determining a first phase of said first spreading code sequence based on an added quasi-coherent signal which is said first and second quasi-coherent signals added together.

2. A synchronization establishing and tracking circuit according to claim 1, wherein said phase determining circuit includes:
    a ranking portion determining a plurality of target phases based on said added quasi-coherent signal; and
    a phase setting circuit setting said first phase to a selected phase selected from among said target phases.

3. A synchronization establishing and tracking circuit according to claim 2, wherein said ranking portion determines an order for said target phases based on said added quasi-coherent signal, and
    wherein said phase setting circuit selects said selected phase in accordance with an order of priority.

4. A synchronization establishing and tracking circuit according to claim 2, wherein said ranking portion comprises:
    a phase determining spreading code generator generating a phase determining spreading code sequence, wherein a phase of said phase determining spreading code sequence is sequentially shifted to one of the target phases;
    a phase determining correlator calculating correlation between said phase determining spreading code sequence and said added quasi-coherent signal to determine added signal correlation values respectively corresponding to candidate phases;
    a ranking circuit selecting said target phases based on said added signal correlation values.

5. A synchronization establishing and tracking circuit according to claim 1, further comprising:
    a maximum correlation phase determining circuit determining a despreading phase based on said first correlation;
    a third spreading code generator generating a third spreading code sequence;
    a despreading circuit despreading said first quasi-coherent signal to produce a despread signal using the third spreading code sequence having said despreading phase; and
    a synchronization detecting circuit detecting a synchronization of said first quasi-coherent signal with said a third spreading code sequence to output a synchronization informing signal informing said first spreading code generator of said synchronization, wherein said first spreading code generator fixes said first phase based on the synchronization informing signal such that the synchronization of said first quasi-coherent signal with a despreading spreading code sequence is established.

6. A synchronization establishing and tracking circuit according to claim 1, wherein said phase determining circuit determining a second phase of said second spreading code sequence based on said added quasi-coherent signal.

7. A synchronization establishing and tracking circuit according to claim 6, wherein said phase determining circuit includes:
    a ranking portion which determines a plurality of target phases based on said added quasi-coherent signal; and
    a phase setting circuit setting said first and second phases to a selected phase selected from among said target phases.

8. A synchronization establishing and tracking circuit according to claim 7, wherein said ranking portion determines an order for said plurality of target phases based on said added quasi-coherent signal, and
    wherein said phase setting circuit selects said selected phase in accordance with an order of priority.

9. A synchronization establishing and tracking circuit according to claim 7, wherein said ranking portion comprises:
    a phase determining spreading code generator generating a phase determining spreading code sequence, wherein a phase of said phase determining spreading code sequence is sequentially shifted to one of a plurality of candidate phases;
    a phase determining correlator calculating correlation between said phase determining spreading code sequence and said added quasi-coherent signal to determine added signal correlation values respectively corresponding to different phases of said target phases; and
    a ranking circuit selecting said target phases based on said added signal correlation values.

10. A synchronization establishing and tracking circuit according to claim 1, further comprising:
    a first maximum correlation phase determining circuit determining a first despreading phase based on said first correlation;
    a third spreading code generator generating a third spreading code sequence;

a first despreading circuit despreading said first quasi-coherent signal to produce a first despread signal using the third spreading code sequence having said first despreading phase;

a second maximum correlation phase determining circuit determining a second despreading phase based on said second correlation;

a second despreading circuit despreading said second quasi-coherent signal to produce a second despread signal using a fourth despreading spreading code sequence having said second despreading phase; and a space diversity circuit identifying a direction of a mobile station transmitting at least one of said first and second received signals, based on said first and second despread signals.

11. A synchronization establishing and tracking circuit for a CDMA base station comprising:

a spreading code generator generating a spreading code sequence;

a correlator calculating correlation between said spreading code sequence and an added quasi-coherent signal corresponding to a received signal received by said CDMA base station;

a ranking circuit storing at least one ranked phases based on said added quasi-coherent signal; and a phase setting circuit setting a phase to a selected phase selected from among said at least one of ranked phases.

12. A synchronization establishing and tracking circuit according to claim 11, further comprising:

an adding circuit adding a quasi-coherent signal and at least one other quasi-coherent signal to produce said added quasi-coherent signal, wherein said other quasi-coherent signal corresponds to one or more other received signal received by said CDMA base station, and wherein said at least one ranked phases are determined based on said added quasi-coherent signal.

13. A synchronization establishing and tracking method for a CDMA base station comprising:

generating a first spreading code sequence;

calculating first correlation between said first spreading code sequence and a first quasi-coherent signal corresponding to a first received signal received by said CDMA base station;

generating a second spreading code sequence;

calculating second correlation between said second spreading code sequence and a second quasi-coherent signal corresponding to a second received signal received by said CDMA base station;

producing an added quasi-coherent signal by adding said first and second quasi-coherent signals; and determining a first phase of said first spreading code sequence based on said added quasi-coherent signal.

14. A synchronization establishing and tracking method according to claim 13, further comprising:

determining a plurality of target phases based on said added quasi-coherent signal;

selecting a selected phase from among said plurality of target phases;

setting said first phase to said selected phase.

15. A synchronization establishing and tracking method according to claim 14, wherein said selecting includes:

determining an order of priority for said target phases based on said added quasi-coherent signal; and selecting said selected phase based on said order of priority.

16. A synchronization establishing and tracking method according to claim 14, wherein said determining said plurality of target phases includes:

generating a phase determining spreading code sequence such that a phase of said phase determining spreading code sequence is sequentially shifted to one of the target phases;

calculating correlation between said phase determining spreading code sequence and said added quasi-coherent signal to determine added signal correlation values respectively corresponding to said target phases; and selecting said target phases from among candidate phases based on said added signal correlation values.

17. A synchronization establishing and tracking method according to claim 13, further comprising:

determining a despreading phase based on said first correlation;

generating a third spreading code sequence;

despreading said first quasi-coherent signal to produce a despread signal using a third spreading code sequence having said despreading phase;

detecting a synchronization of said first quasi-coherent signal with said the third spreading code sequence to output a synchronization informing signal indicative of the synchronization; and fixing said first phase based on the synchronization informing signal such that said synchronization of said first quasi-coherent signal with said third spreading code sequence is established.

18. A synchronization establishing and tracking method according to claim 13, further comprising:

determining a second phase of said second spreading code sequence based on said added quasi-synchronous signal.

19. A synchronization establishing and tracking method according to claim 18, further comprising:

determining a plurality of target phases based on said added quasi-coherent signal; and setting said first and second phases to a selected phase selected from among ranked phases based on said added quasi-coherent signal.

20. A synchronization establishing and tracking method according to claim 13, further comprising:

determining a first despreading phase based on said first correlation;

despreading said first quasi-coherent signal to produce a first despread signal using a third spreading code sequence having said first despreading phase;

determining a second despreading phase based on said second correlation;

generating a fourth spreading code sequence;

despreading said second quasi-coherent signal to produce a second despread signal using the fourth spreading code sequence having said second despreading phase; and identifying a direction of a mobile station transmitting at least one of said first and second received signals, based on said first and second despread signals.

21. A synchronization establishing and tracking method according to claim 20, further comprising:

adding a first quasi-coherent signal and at least one other quasi-coherent signal to produce said added quasi-coherent signal, wherein said other quasi-coherent signal corresponds to one or more other received signal received by the CDMA station, and wherein said at least one of ranked phases are determined based on an added quasi-coherent signal.

22. A synchronization establishing and tracking method for a CDMA base station comprising:

generating a spreading code sequence;

calculating correlation between said spreading code sequence and an added quasi-coherent signal corresponding to a first received signal received by said CDMA base station;

storing at least one ranked phases based on said added quasi-coherent signal; and setting a phase to a selected phase selected from among said at least one of ranked phases.

* * * * *